Patented May 8, 1951

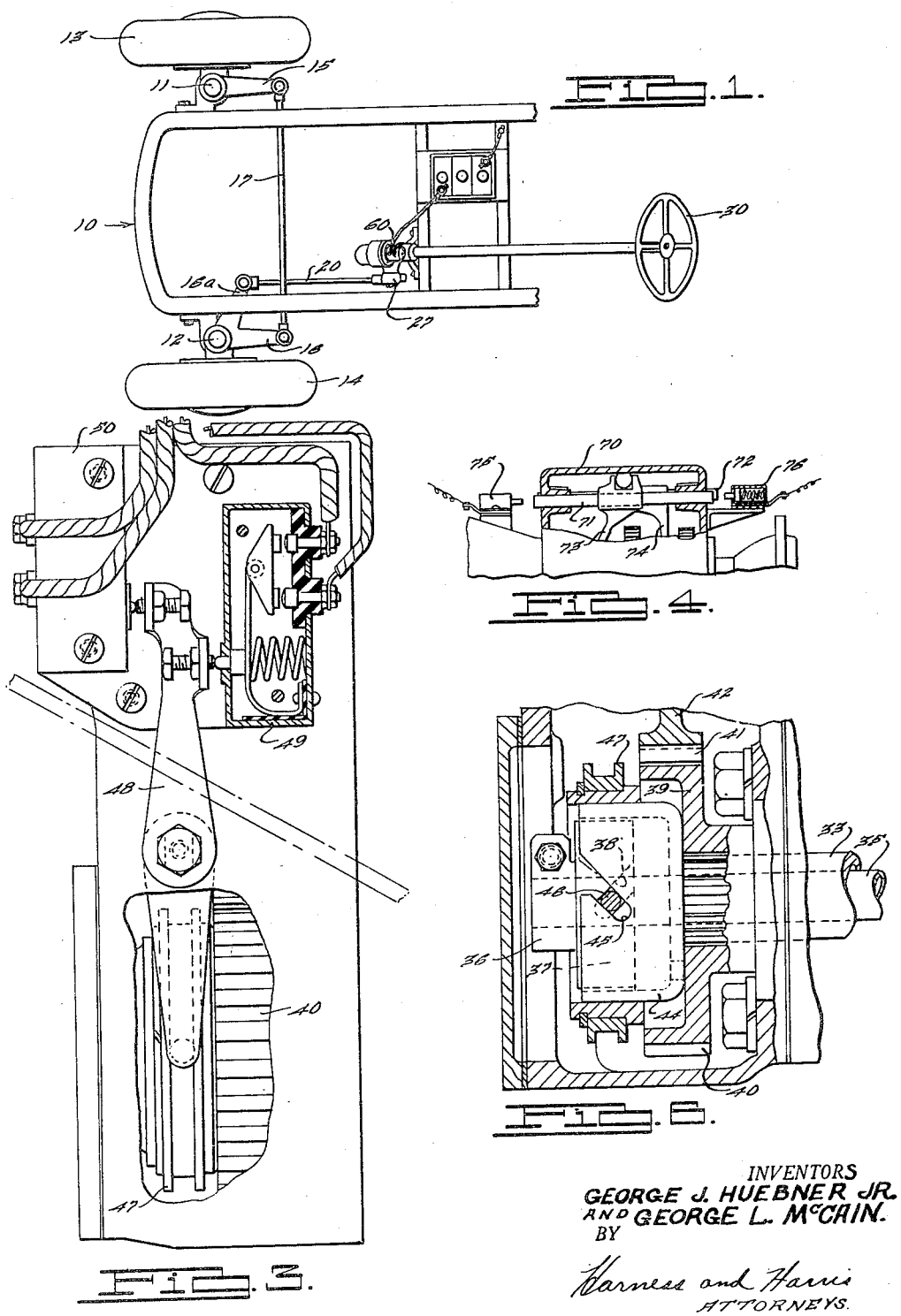

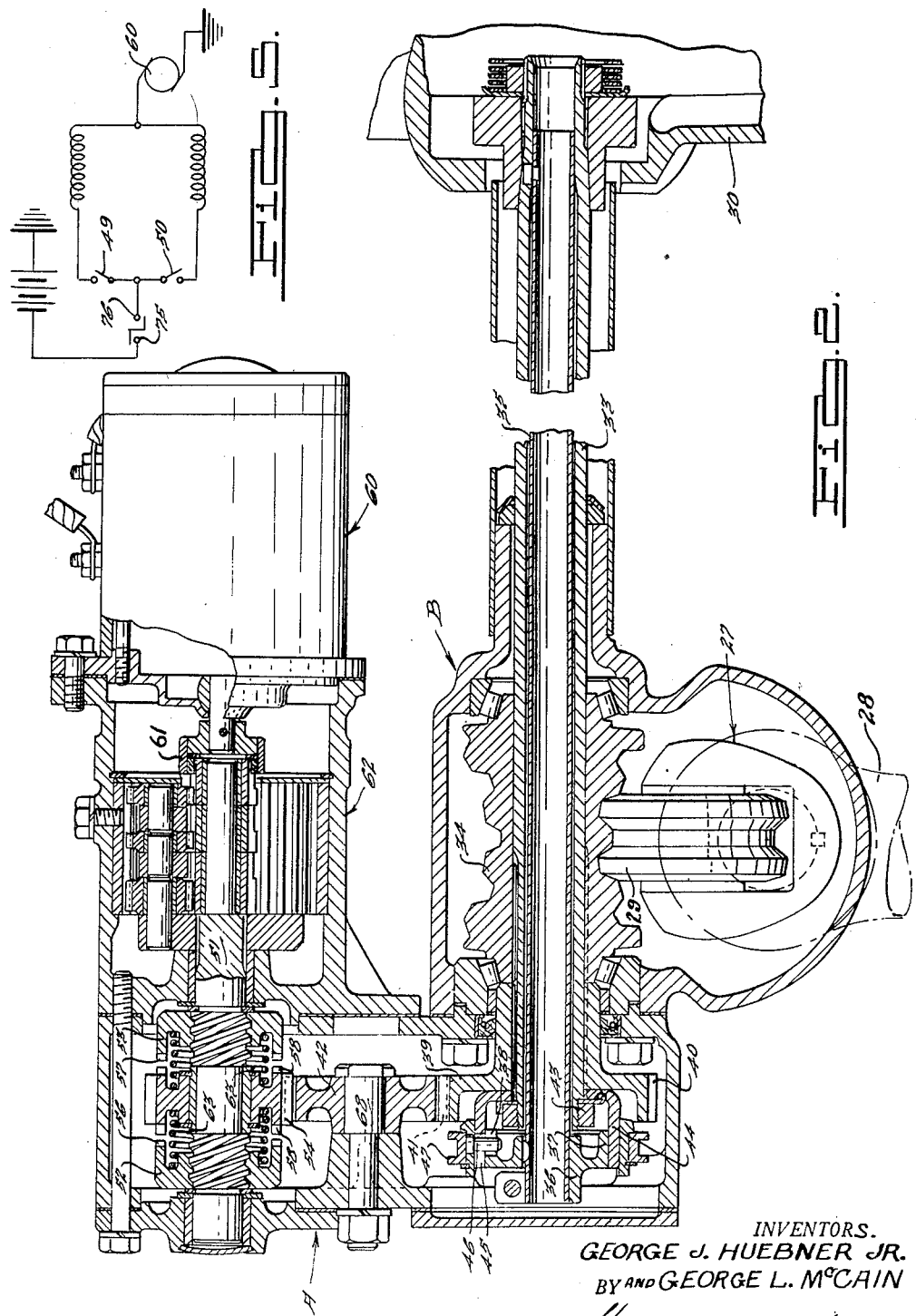

2,551,742

UNITED STATES PATENT OFFICE 2,551,742

POWER ASSISTED STEERING

George J. Huebner, Jr., and George L. McCain, Detroit, Mich., assignors to Chrysler Corporation, Highland Park, Mich., a corporation of Delaware Application October 16, 1947, Serial No. 780,206

12 Claims. (Cl. 180—79.1)

This invention relates to a steering mechanism for a motor vehicle, or the like, and particularly to a steering mechanism wherein the manual operation of the steering mechanism is automatically assisted by a power operated device whenever torque or turning effort, in excess of a predetermined amount, is required.

An object of this invention is to provide a power assisted steering mechanism wherein the power assisting mechanism is a separate unit from the manual steering mechanism and is connected thereto in such a manner that failure of the power assisting mechanism will in no way impede or affect the operation of the manual steering mechanism.

A further object of this invention is to provide a power assisting mechanism for the manually operated steering system which can be readily connected to the manually operated steering system as an additional accessory.

A further object of this invention is to provide gear shift control means whereby the power assisting mechanism is automatically rendered operative when operating in the lower speed ratios where manual steering might require the driver to exert excessive effort, as when making sharp turns or when parking, the power assisting mechanism being automatically disconnected from the manual steering mechanism when the vehicle is operating in the higher speed ratios where manual steering is relatively easy.

Another object of this invention is to provide a power assisted steering mechanism in which the steering is always under the manual control of the driver and in which there is always a substantially rigid, direct, positive connection between the steering gear and the running gear, the power assisting mechanism merely acting upon the manually operable steering means to assist the operator and relieve him of any burdensome or tiring efforts.

A further object of this invention is to provide a manually operable steering mechanism which permits the use of the steering gear ratio most efficient at the higher vehicle speeds, said steering mechanism being automatically power assisted at the lower vehicle speeds where the selected gear ratio would otherwise require the vehicle operator to exert considerable effort in order to quickly and skillfully maneuver the vehicle. Manually operated steering mechanisms usually use a steering gear ratio, wheel to wheel, which is a compromise between the gear ratio most advantageous for normal driving at the higher cruising speeds and the ratio most advantageous for making sharp turns and parking at the lower vehicle speeds. It has been found that such a compromised gear ratio often requires the exertion of considerable effort by the driver in parking or turning at the lower vehicle speeds. This fact is of considerable importance to some women drivers, elderly persons and invalids who experience considerable difficulty in tugging at the steering wheel to provide the necessary torques to maneuver the vehicle at the lower speeds. Furthermore, by relieving the vehicle driver of the burdensome and tiring efforts required to maneuver the vehicle at the lower speeds, driving is made more enjoyable for everyone.

In order to provide a safe, simple steering mechanism which uses the most efficient steering gear ratio at the higher speeds, where most of the driving time is accumulated, and to still provide a steering mechanism which is substantially effortless to operate at the lower vehicle speeds, we propose a power assisting mechanism adapted to be connected to the conventional, manually operated, steering mechanism which power assisting mechanism automatically becomes operative whenever a turning effort, in excess of a predetermined, relatively small valve, is required.

Our power assisting mechanism is designed for incorporation in and use with the conventional, manually operated steering mechanism normally supplied with the vehicle and may be provided as an additional accessory or as standard equipment. Our device is such that it can be readily and easily incorporated in the existing steering system without any major alterations or changes, and, as it is operated by a small size, reversible, electric motor, it may be connected to the existing vehicle electrical system. Due to the fact that our power assisting mechanism is merely added to the existing, manually operated, steering mechanism, the power assisting mechanism in no way interferes with the operation of the manually operated system and the vehicle is always under the direct, positive control of the manual system. Furthermore, during normal driving of the vehicle at the higher cruising speeds, as well as at the lower speeds where only small turning moments are required, the power assisting mechanism is inoperative and as a result there is a minimum drain on the electrical system due to the infrequent use of the electric motor-driven, power assisting mechanism. Due to the fact that power assistance for manual steering is seldom required when the vehicle is operating in the higher speed ratios, we propose to also incorporate a gear shift control means for the electrical circuit operating our power assisting unit. This control is such that when the vehicle is operating in a low, forward speed gear ratio, or in reverse gear, the power assisting mechanism is operative, whereas, when the transmission is shifted into the higher cruising speed ratios, the electrical circuit for the power assisting means is broken and the power assisting means is rendered inoperative.

Other objects and advantages of our invention will become apparent from the following description wherein a preferred form of the invention is disclosed. In the accompanying drawings, reference characters are used to designate corresponding parts referred to below:

Fig. 1 is a plan view of the front portion of the chassis of an automobile having our invention applied thereto;

Fig. 2 is an enlarged sectional elevational view of a steering column showing our power assisting mechanism applied thereto, portions of the steering column being broken away to more clearly illustrate our invention;

Fig. 3 is a side elevational view of a portion of the power assisting mechanism illustrating the control switch mechanism, portions of the casing being broken away to clearly disclose the control linkage;

Fig. 4 is a fragmentary side elevation of the transmission casing with portions broken away to clearly show the gear shift control switches;

Fig. 5 is a diagrammatic sketch of the wiring diagram for our power assisting mechanism, and Fig. 6 is a fragmentary sectional elevational view of the pin and slot connecting means between the control tube and the steering tube.

Referring more specifically to the drawings the numeral 10 denotes the chassis of a motor vehicle which has pivotally secured thereto as at 11 and 12 steerable wheels 13 and 14 respectively. These steerable wheels are operated by suitable levers 15 and 16 which levers have their free ends connected to each other by means of a tie rod 17. The lever 16 has an arm 16a to which is secured one end of a steering drag link 20, the other end of drag link 20 being connected to a pitman arm (see Fig. 2) 28 which is connected to the worm wheel assembly 27.

Our power assisting steering mechanism A is connected to the lower end of the conventional manually operated steering mechanism B. The manually operated steering mechanism B includes a stress distortable, substantially rigid, guiding means or steering tube 33 having a steering wheel 30 fixed to its upper end portion. A worm gear 34 is keyed to the lower end portion of the steering tube 33 and is adapted to mesh with the pivotally mounted worm wheel 29 of assembly 27 which assembly is connected to steering link 20 through the aforementioned pitman arm 28. The power assisted steering mechanism A includes a substantially rigid, tubular, control element 35, mounted within steering tube 33, tube 35 having its upper end portion connected to the steering wheel 30 while its lower end portion is free of a direct connection with the worm wheel assembly 27. The lower end of tube 35 extends slightly beyond the lower end of steering tube 33 for a reason that will subsequently be explained. Fixed to the lower protruding end portion of tube 35 is an annular control member 36 having an axially disposed, peripheral flange portion 37 which contains spiral slots 38. Splined to the lower end of steering tube 33 is a gear member 39 having teeth 40 adapted to mesh with teeth 41 of a power driven idler gear 42, subsequently described in detail. A nut member 43, which locks gear member 39 on steering tube 33, has an axially disposed flange portion 44 which provides a control member having portions that extend concentrically about flange portion 37 of control member 36. The flange portion 44 of nut member 43 also has spiral slots 45 which are superimposed on and extend at an angle to the slots 38 of control member 36. Pins 46 extend through the slots 38 and 45 in control members 36 and 44 respectively so as to operatively connect the lower end of steering tube 33 with the lower end of control tube 35. The slot formations 38 and 45 are disposed such that relative movement between the tubes 33 and 35 will cause pins 46 to move axially with respect to the tubes. Pins 46 are connected to a channel-shaped collar member 47 which is adapted to actuate a lever 48 (see Fig. 3) so as to control the operation of switches 49 and 50 which are adapted to control a reversible electric motor 60. Electric motor 60 drives a threaded shaft 51 through a reduction gear box 62. Motor driven shaft 51 has drive gears 52 and 53 threaded on its projecting end portion. Rotatably mounted on shaft 51, between gears 52 and 53, is a drive pinion 54. Extending from the inner side faces of gears 52 and 53 are teeth 56 and 57 respectively which teeth are adapted to mesh with the teeth 58 extending from the opposite side faces of the pinion gear 54. Teeth 58 engage the teeth 56 or 57 when one of gears 52 or 53 is screwed up against the pinion gear 54 due to the rotation of shaft 51.

Depending on the direction of relative rotative movement between steering tube 33 and control tube 35 the pins 46 will shift switch actuator collar 47 axially along tube 35. Moving collar 47 in one axial direction will cause lever 48 to close one of the control switches 49 or 50 and this will cause rotation of reversible motor 60 in one direction. Shifting collar 47 in the opposite direction will cause the other of the aforementioned control switches to close and motor 60 to rotate shaft 51 in the opposite direction. Depending on the direction of rotation of shaft 51, one of gears 52 or 53 will be screwed up against pinion gear 54 and teeth 58 will engage teeth 56 or 57 respectively. On engagement of the teeth 58 with either teeth 56 or 57 of the drive gears, pinion gear 54 will be rotated in one direction or the other and accordingly idler gear 42 will be rotated. Idler gear 42 is rotatably mounted on a shaft 68 so that it will mesh with the motor driven pinion gear 54 and gear member 39 that is fixed to steering tube 33. Compression springs 63, mounted between idler gear 54 and gears 52 and 53, normally hold gears 52 and 53 disengaged from pinion gear 54 when shaft 51 is not being rotated by motor 60. Rotation of idler gear 42 causes gear member 39 to rotate and, due to the splined connection between gear member 39 and steering tube 33, this applies power assistance to the steering tube 33. Whenever there is sufficient torque applied to the steering tube 33 to cause a predetermined relative rotation between the substantially rigid tubes 33 and 35 then ring member 47 closes one of the switches 49 or 50 controlling motor 60 and power assistance is applied to the manually operable steering mechanism B. Motor 60 is equipped with a slip clutch 61 to prevent the motor being damaged in the event the steerable wheels 13 and 14 are bearing against some immovable object such as a curb, or the like, and an attempt is made to turn the wheels in the direction of the resisting object.

It has been ascertained from tests that the steering tube 33 will function as a torsion bar and twist approximately .32 degree, under 200 inch-pounds of torque, for each foot of length, and since the steering tube is generally about 45 inches in length, the rotational deformation or twist of the tube 33, under 200 inch-pounds of torque, will be approximately 1.2 degrees. Due to the pin and slot connections between the members 36 and 44, this small amount of twist or deformation of steering tube 33, caused by the application of 200 inch-pounds of torque to the steering wheel 30, is transformed into approximately 0.4 inch of axial movement of the collar 47 and this axial movement of switch actuator collar 47 is adequate to operatively control the movement of lever 48 and operate the motor switches 49 and 50. As the tube 33 is connected to the steerable wheels 13 and 14 of the vehicle running gear, whereas the tube 35 is free of these steerable wheels, the application of torque to the steering wheel 30 causes the torsion bar type of control tube 33 to be stressed and deformed due to its rotation being retarded by the wheels 13 and 14, whereas substantially rigid tube 35 turns freely with the steering wheel 30 and consequently relative motion between tubes 33 and 35 results. Whenever sufficient relative motion between tubes 33 and 35 occurs to actuate the control switches 49 and 50 then power assistance is applied to the steering tube 33 provided the electrical circuit for the motor 60 is in an operative condition.

As previously pointed out power assistance for manual operation of the vehicle steering mechanism is seldom required when the vehicle is operating in the high speed gear ratios. Accordingly, we propose to incorporate means to automatically de-energize the power assisting mechanism whenever the vehicle is operating in the high speed gear ratios, said means automatically reconditioning the power assisting mechanism for operation whenever the vehicle is shifted into a low forward speed or reverse gear. As shown in Fig. 4 the conventional transmission housing 70 has slidably mounted therein a pair of shift rails 71 and 72, each rail carrying a shifter fork 73 and 74, respectively. The fork 73 carried by rail 71 is adapted to shift the transmission into and out of the low or first forward speed gear as well as the reverse gear. The fork 74 carried by rail 72 is adapted to shift the transmission into and out of the second and high forward speed gears. Mounted on the housing 70 are switches 75 and 76, each of which is adapted to be closed by the movement of shift rail 71 to either one of its gear selector positions. When the transmission is shifted into either first or reverse gear then rail 71 will close either switch 75 or 76 and this will complete the electrical circuit for the power assisting steering mechanism and condition it for control by motor switches 49 and 50 respectively. When shift rail 71 is in a neutral position rail 71 does not contact either of the switches 75 and 76 and the electrical circuit for the power assisting mechanism is broken, therefore power assistance will not be brought into operation even though switches 49 and 50 may be closed by relative rotational movement between tubes 33 and 35 due to the application of large torques to the steering wheel 30. Switches 75 and 76 are connected in parallel in the electrical circuit for the assisting motor 60, therefore closing either of the switches 75 or 76 completes the motor circuit. It is obvious that rail 71 is in a neutral position whenever rail 72 is in operation, therefore the motor circuit is always broken when the vehicle is operating in second or high forward speed. While a conventional three forward speeds and reverse transmission has been used to illustrate the gear shift control means, it is obvious that this control means can be incorporated in any transmission of the manual, semi-automatic or automatic type.

We claim:

1. In a steering mechanism, a steerable member, an integrally formed, torsionally deformable, substantially rigid steering shaft positively connected to said steerable member so as to provide for manual movement thereof, a steering wheel fixed to said steering shaft, a rigid control shaft concentrically arranged with respect to said steering shaft having a portion thereof fixed to said steering wheel and being free of said steerable member, a power unit control lever, interengaging means carried by said shafts and connected to said control lever adapted to transmit relative movement between said shafts to said power unit control lever and thereby effect actuation of said lever in either of two opposite directions, a power unit operatively connected with said control lever, means adapted to drivingly connect said power unit to said steering shaft upon actuation of said lever so as to cause power assisted movement of said steering shaft in either of two opposite directions.

2. In a control mechanism, a movable member, a first torsion bar control shaft positively connected to said movable member to provide for manual movement of said movable member, a control wheel fixed to said first control shaft, a second rigid control shaft fixed to said control wheel and free of said movable member concentrically arranged with respect to said first shaft, slotted portions on each of said shafts arranged in superimposed relationship, pin means extending through said slotted portions adapted to be moved in either of two directions due to relative movement between portions of said shafts, a power unit, a power unit control lever connected between said pin means and said power unit adapted to cause energization of said power unit upon movement of said control lever, and gear means arranged to be drivingly connected between said power unit and said first control shaft upon energization of said power unit so as to provide for power driven movement of said first control shaft in either of two directions depending upon the direction of movement of said control lever.

3. In a steering mechanism, a steerable member, a torsion bar type of steering shaft positively connected to said steerable member so as to provide means for manual movement of said steerable member, a steering wheel fixedly mounted on said steering shaft, a rigid control shaft concentrically mounted within said steering shaft having a portion thereof fixed to said steering wheel and being free of connection with said steerable member, annular members carried by said shafts each having slotted, axially extending flange portions concentrically arranged with respect to each other, pin means extending through the slotted portions of said annular members, a control lever connected to said pin means so as to be actuated in either of two opposite directions by relative movement between said shafts, a pair of switches adapted to be operated by movement of said control lever, a reversible electric motor arranged to have the energization and direction of rotation thereof controlled by said switches, gear means arranged to be drivingly connected between said motor and said steering shaft upon energization of said motor, said gear means being adapted to apply power assistance to the movement of said steering shaft after sufficient torque has been applied to said steering shaft to cause a predetermined relative movement between portions of said shafts.

4. In a combined manually operated and power assisted steering mechanism comprising a steerable member, a steering wheel, and motion transmitting means connected therebetween, said motion transmitting means providing means to manually operate said steerable member and including a unitary, elastically deformable, rotatable, steering tube positively connected to the steerable member and to the steering wheel, normally inoperative, electrically operated, power driven assisting means for the manually operable motion transmitting means adapted upon activation to be connected with said steering tube to effect rotation of said tube, comprising a control member for controlling activation of said power driven assisting means, said control member being fixedly connected to said steering wheel and being free of said steerable member, and means to transmit relative motion between said motion transmitting means and said control member connected between said control member and said power driven assisting means adapted to render said power assisting means operative when resistance to manual operation of said steering mechanism by said steering tube creates a predetermined relative movement between said steering tube and said control member.

5. In a combined manually operated and power assisted steering mechanism, including a steerable wheel, substantially rigid, positively connected, manually operated, control means for said steerable wheel including a steering wheel and an integrally formed, elastically deformable torsion bar steering tube positively connected to said steering wheel and the steerable wheel, normally inoperative power driven assisting means for said substantially rigid, manually operated, control means comprising a rigid control member mounted within said steering tube and having a portion positively connected to said steering wheel and being free of connection with said steerable wheel, mechanical means extending between said rigid control member and said steering tube adapted to transmit relative motion between said tube and said member, an electrical circuit including a control switch, means connecting said mechanical means to said control switch to effect actuation thereof, an electric motor connected to and operated by said control switch, and gear means, driven by said motor, adapted to connect said motor to said steering tube to effect power driven rotation thereof, said power driven assisting means being rendered operative after resistance to manual operation of said steering mechanism by said steering tube has established a deformation of said tube and a predetermined relative motion between said control member and said steering tube.

6. A power driven assisting mechanism for a manually operable, steering system that includes a steerable wheel, an integral, substantially rigid, elastically deformable, torsion bar type of steering shaft, and a steering wheel, the several wheels and the shaft being positively connected together to form a substantially rigid linkage, comprising a rigid control member to be connected to said steering wheel and to be free of said steerable wheel, motion transmitting means operatively connecting said steering shaft and said control member adapted to transmit relative movement between said shaft and said control member, a power unit control means, means connecting said motion transmitting means to the control means for the power unit, a power unit, and means adapted to drivingly connect said power unit to said shaft to effect movement thereof by said power unit, the arrangement being such that a predetermined resistance to movement of said steerable wheel effects an elastic deformation of said shaft that causes relative movement between said shaft and said control member whereby the motion transmitting means connects said power unit to said shaft so as to apply power assistance to manual operation of said shaft.

7. A power driven assisting mechanism for a manually operable steering system including steerable members, an integrally formed substantially rigid, torsionally deformable, rotatable, steering shaft and a steering wheel, said steering wheel being positively connected to said shaft and said shaft positively connected to the steerable members of the system, comprising a rigid control member positively connected to said steering wheel and free of said steerable members, pin and slot motion transmitting means operatively connecting said shaft and said control member arranged to transmit relative rotational movement between said shaft and said control member, a control lever, means connecting said pin and slot motion transmitting means to the control lever to effect actuation thereof upon relative rotational movement between the shaft and control member, motor control means adapted to be actuated by said lever, a reversible electric motor associated with the motor control means, and motor driven gear means adapted to be drivingly connected to said shaft to effect power assisted operation thereof, a predetermined resistance to manual rotation of said shaft causing deformation of said shaft and relative rotational movement between said shaft and said control member to thereby automatically connect said power driven gear means to said shaft so as to apply power assistance to manual operation of said shaft.

8. The combination set forth in claim 7, wherein a slip clutch is provided between said motor and gear means.

9. In a combined manually operated and power assisted steering mechanism including steerable wheels, manually operated control means including an integral, substantially rigid, torsionally deformable steering shaft provided with a steering wheel, said shaft being positively connected to the steering wheel and the steerable wheels by rigid elements, normally inoperative power driven assisting means for assisting in the operation of said manually operated control means comprising a rigid control member having a portion connected to said steering wheel and being free of connection with said steerable wheels, a control lever, means extending between said control member and said steering shaft adapted to transmit relative motion between said shaft and said member to the control lever, means connecting said control lever to a power unit control member, a power unit operatively controlled by said power unit control member, gear means arranged to be driven by said power unit and adapted to be automatically connected to said steering shaft when power assistance is to be applied to said shaft, said power driven assisting means being automatically rendered inoperative after resistance to manual operation of said steering mechanism has deformed said shaft and established a predetermined relative motion between said control member and said steering shaft.

10. In combination, a steerable element and a steering wheel, a torsion bar type of steering tube and a substantially rigid control tube, said tubes each having portions thereof fixedly connected to said steering wheel, a worm gear fixedly mounted on said steering tube, a worm wheel meshingly engaged with said worm gear having portions thereof connected to the steerable element to be controlled by said steering wheel, a gear member and a control member each fixedly mounted on said steering tube so as to be rotated therewith, said control member having an axially disposed portion with circumferentially extending, inclined, slots therein, a control member fixedly mounted on said control tube having an axially disposed portion with circumferentially extending, inclined, slots therein, the slots in said control members being arranged in superimposed relationship and extending at an angle to each other, a switch actuator having pin means extending through the superimposed slots in said control members whereby a predetermined relative movement between said steering tube and said control tube effects movement of said switch actuator, a motor and a switch therefor adapted to be controlled by said switch actuator, and means to drivingly connect said motor to the gear member on said steering tube to effect motor driven movement of said steerable element.

11. The combination set forth in claim 10 wherein the means drivingly connecting the motor to the steering tube comprises gear means adapted to provide for rotation of said steering tube in opposite directions depending on the direction of rotation of said motor.

12. The combination set forth in claim 11 including an overload release means in the drive train between said motor and the gear member on said steering tube.

GEORGE J. HUEBNER, JR.
GEORGE L. McCAIN.

REFERENCES CITED

The following references are of record in the file of this patent:

UNITED STATES PATENTS

| Number | Name | Date |
|---|---|---|
| 1,144,552 | Lardner et al. | June 29, 1915 |
| 1,377,306 | Brush | May 10, 1921 |
| 1,774,634 | Coates | Sept. 2, 1930 |
| 1,848,977 | Seelinger | Mar. 8, 1932 |
| 1,948,487 | Berry | Feb. 27, 1934 |
| 2,109,418 | Fuller | Feb. 22, 1938 |
| 2,232,165 | Cochran | Feb. 18, 1941 |
| 2,321,377 | French | June 8, 1943 |
| 2,368,135 | Hamill | Jan. 30, 1945 |